Dec. 2, 1941.    R. A. SANDBERG    2,264,954
BRAKE LEVER
Filed Feb. 16, 1940    2 Sheets-Sheet 1
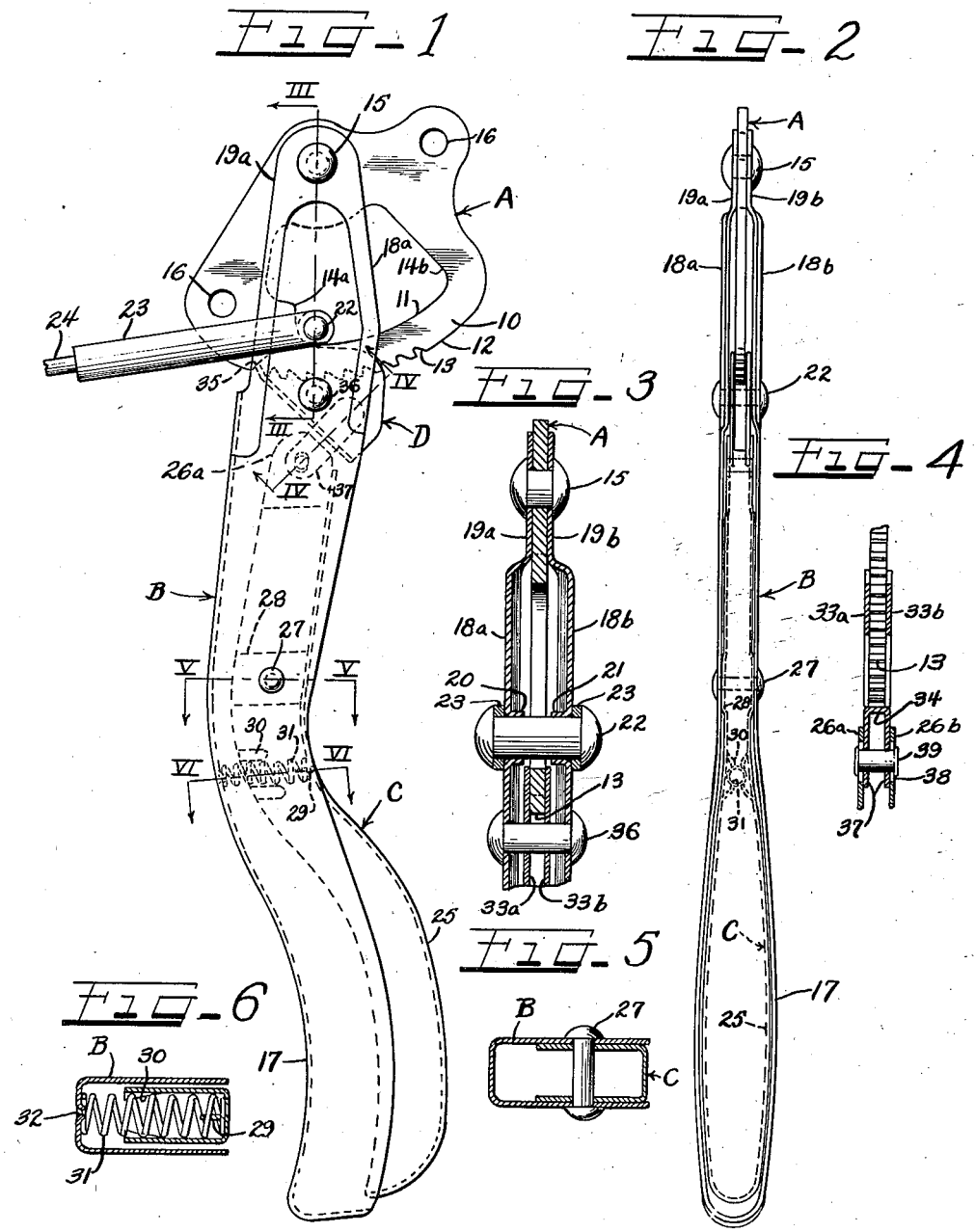
Inventor
Ray A. Sandberg
by [signature] Attys

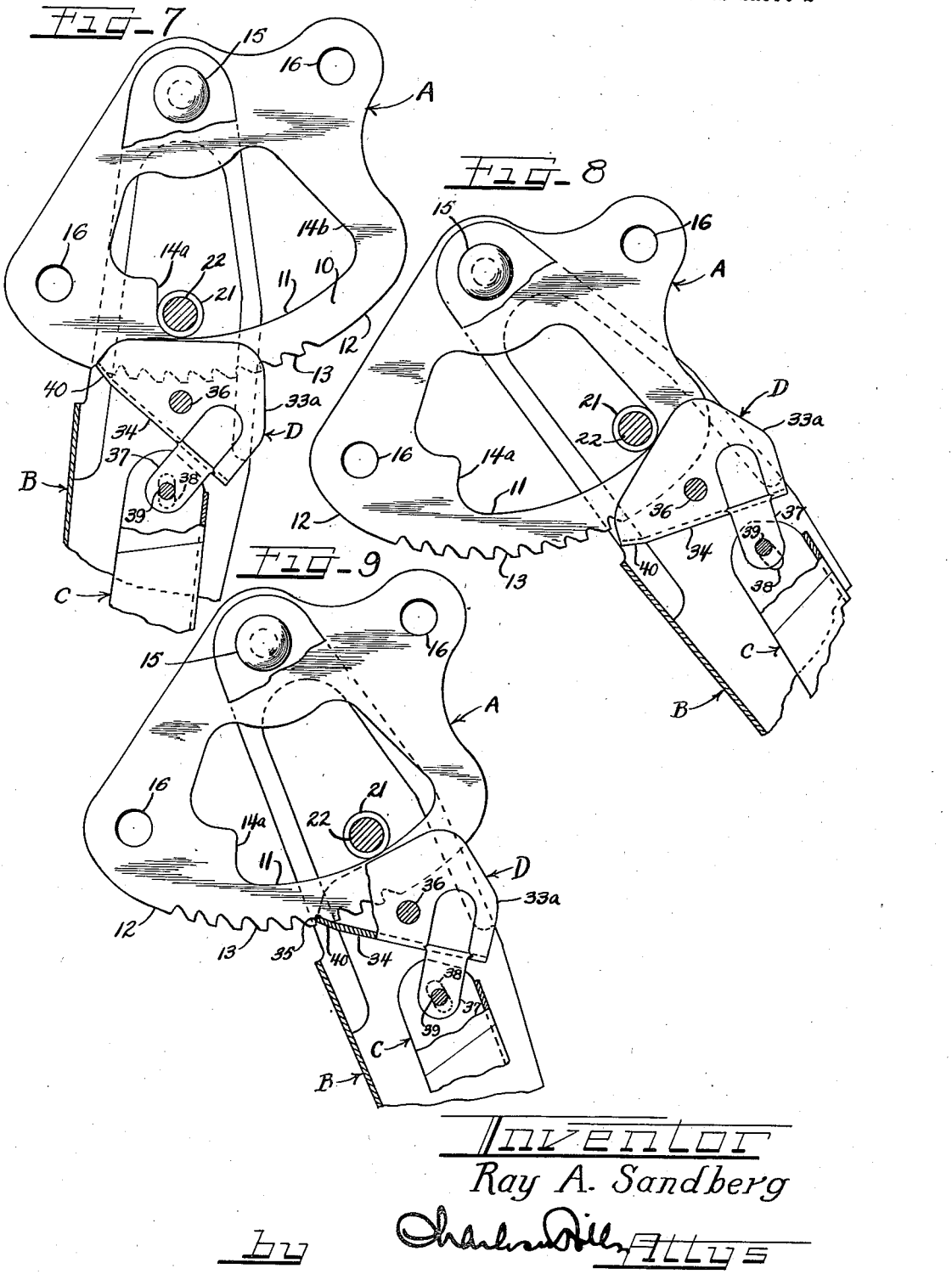

Patented Dec. 2, 1941

2,264,954

UNITED STATES PATENT OFFICE 2,264,954

BRAKE LEVER

Ray A. Sandberg, Waukegan, Ill., assignor to Houdaille-Hershey Corporation, Detroit, Mich., a corporation of Michigan Application February 16, 1940, Serial No. 319,247

9 Claims. (Cl. 74—537)

The present invention relates to a brake lever, and more particularly to a brake lever which provides a pawl and ratchet construction of such novelty that the entire brake lever assembly may be formed from metal having thinner sections than the conventional brake levers without impairing its strength or operativeness.

Brake levers of the usual or conventional type are stamped from flat material of heavy gauge, and in levers of the pawl and ratchet type the blank metal used is usually at least $\frac{3}{16}$ inch in thickness. In forming these parts, it is customary to broach or mill the toothed section of the pawl in order to provide a sufficient bearing with a sector tooth which it engages during brake lever operations.

In most of the usual brake lever constructions perfect alignment between the pawl and ratchet is not maintained due to the lack of means for effecting such engagement. Tests show that the usual engagement between such a pawl and ratchet is only approximately two-thirds of their full width. In other words, the effective lateral contact between a pawl and ratchet is but two-thirds of the full contact provided.

It is, therefore, an important object of this invention to provide a brake lever with a pawl and a ratchet having means for holding them in perfect alignment to effect full width contact therebetween so that they may be formed of flat metal of less thickness then the usual pawl and ratchet and still maintain the same effective bearing surface.

Another object of the present invention is the provision of a brake lever having a pawl which cooperatively engages a sector in perfect self-alignment in any adjusted position of the lever member.

A further object of the present invention is the provision of a pawl which loses none of its cooperating effectiveness with a sector as it wears.

A still further object of this invention is the provision of a brake lever construction having means for connecting the brake rod mechanism to the lever member, said means coacting with the lever support to define the adjustable limits of the lever in either brake-operating or brake-releasing directions.

Another and still further object of this invention is to provide an improved brake lever of the pawl and ratchet type wherein all of the parts are formed as stampings only.

A further object of this invention is the provision of an improved brake lever of such novel construction as to permit the use of members having thinner sections than employed in present conventional types of brake levers, without adversely affecting the operativeness or strength thereof.

A still further object of this invention is to improve and simplify a brake lever construction to reduce the cost of manufacture without impairment of its function or efficiency.

The novel features believed to be characteristic of this invention are set forth with particularity in the appended claims. The invention itself, however, both as to its organization and manner of construction, together with further objects and advantages thereof may best be understood by reference to the following description, taken in connection with the accompanying drawings, in which:

Figure 1 is a view in side elevation of a brake lever construction embodying the principles of the present invention, and which illustrates the relative position of the parts when the brake lever is moved to a full brake-released position.

Figure 2 is an outer edge elevational view of the brake lever illustrated in Figure 1.

Figure 3 is an enlarged fragmentary vertical cross-sectional view, with parts in elevation, taken substantially along the plane indicated by the line III—III of Figure 1.

Figure 4 is an enlarged fragmentary angular cross-sectional view, with parts in elevation, taken substantially along the plane indicated by the line IV—IV of Figure 1.

Figure 5 is an enlarged transverse cross-sectional view, with a part in elevation, taken substantially along the plane indicated by the line V—V of Figure 1.

Figure 6 is an enlarged transverse cross-sectional view, with a part in elevation, taken substantially along the plane indicated by the line VI—VI of Figure 1.

Figure 7 is an enlarged fragmentary side-elevational view, with portions broken away and parts illustrated in vertical section, of the upper portion of the brake lever construction shown in Figure 1.

Figure 8 is a view similar to Figure 7, illustrating the relative position of the parts when the lever member is moved to a full brake-actuated position, with the pawl-release member holding the pawl in spaced relation from its cooperating ratchet.

Figure 9 is a view similar to Figure 7, illustrating the toothed engagement between the pawl and ratchet when the lever is swung to an adjusted position in which the brakes are partially actuated.

The drawings will now be explained.

The form of the invention shown in the drawings includes a mounting plate or bracket A of flat metal stamped to proper size and form. A portion of the bracket A is formed to provide a sector 10 having concentric edges 11 and 12, the outer edge 12 having a plurality of ratchet teeth 13 formed along a portion thereof to constitute a clutching member and the inner edge 11 being provided with inwardly extending edges 14a and 14b for a purpose to be described more fully hereinafter.

The concentric edges 11 and 12 are described by radii having a center in the axis of the pivot 15, such as a rivet, bolt or the like, and which pivotally connects a lever member B to the support or bracket A. Apertures or bolt holes 16 are also provided in the bracket A whereby it may be secured in place behind the instrument board of an automotive vehicle to support the brake lever B in dependent relation with its handle below the lower margin of the instrument board.

As best shown in Figures 1 and 2, the brake lever member B is formed as a stamping from flat metal to provide a body portion which is U-shaped for a major portion of its length, its side walls being flared at one end to form a grip portion 17 and at its other end the side walls extending to form spaced legs 18a and 18b. At the ends of these legs, there is provided inwardly offset portions 19a and 19b which are suitably apertured to receive the pivot pin 15 which connects the lever in straddling relation to the supporting bracket.

Intermediate their ends, the spaced legs 18a and 18b are provided with hollow inturned trunnions 20 and 21 which receive therethrough a pivot pin 22. A clevis 23 connects the brake operating rod 24 to the brake lever member B by means of the pivot pin 22.

A release member C, formed of flat metal and stamped to a U-shaped configuration in section, is provided at its lower end with a flared grip portion 25 (Figure 1), and at its upper end with short spaced legs 26a and 26b (Figure 4). The release member C is pivotally connected to and in nested relationship between the side walls of the lever B by a suitable pivot pin 27, the U-shaped sections of the two members facing each other, as illustrated in Figures 1 and 5. If necessary, a bulged seating portion 28 (Figures 1 and 2) may be provided to insure nested longitudinal alignment and to eliminate lateral clearance between the lever and release members.

Adjacent the upper end of the grip portion 25, there is provided a lug 29 which is struck inwardly from the web of the release member C. The edge portions of the side walls of the release member adjacent the lug 29 are depressed inwardly to form a round seat 30, which seat cooperates with the lug to position one end of the coil spring 31. The other end of the coil spring is held in position by a trunnion-like lug 32 which is struck inwardly from the web of the lever member B. The coil spring 31 serves normally to hold the release member C in a projected operative position, as shown in Figure 1.

A U-shaped pawl D is formed with side walls 33a and 33b and a connecting web 34 (Figure 4). An edge 35 of the connecting web is arranged to engage the ratchet teeth 13 (Figures 1 and 9). As will at once be understood by those skilled in the art, the ratchet and pawl form clutching members for holding the lever member B in adjusted position. The side walls of the pawl D are pivoted to the side walls of the lever member B by means of a pivot pin 36 in such a manner that the side walls 33a and 33b engage and telescope the side surfaces of the sector 10 in straddling relation therewith.

A pair of ears 37 is struck out from the side walls of the pawl D and are bent downwardly from the web 34 thereof to form a U-shaped link. The spaced legs 26a and 26b of the release member are provided with elongated apertures 38 which register with suitable apertures in the ears 37, the legs straddling the ears and being pivotally connected thereto by a flat-headed pivot pin 39, as shown in Figure 4.

The arrangement shown in Figure 1 depicts the relative position of parts with the lever in fully brake-released position. To release the lever from the position shown in Figures 2 and 7 and swing it to the right in a brake-setting direction, the operator merely grasps the grip portion 17 of the lever and pulls it in that direction. By so doing, the toothed edge 35 of the pawl ratchets along the teeth 13, engaging with the closest tooth when the operator releases his grip on the lever.

In an intermediate adjusted position of the lever, the relative position of parts is best illustrated in Figure 9. If the operator continues to pull the lever in a brake-setting direction, the amplitude of swing is limited by engagement between the pivot pin 22 and the bracket edge 14a, the lever in this position having fully actuated the brakes.

To release the clutching engagement between the pawl and ratchet, the operator merely squeezes the palm of his hand against the grip 25 of the release member C which rocks the pawl about its pivotal connection to the lever to the position shown in Figure 8, and which unclutches the pawl from the sector and enables movement of the lever to the left in a brake-releasing direction.

It is to be noted, in Figures 7 to 9 that the web portion 49 immediately adjacent the edge 35 of the pawl D is offset angularly to fully seat against a sloping portion of the ratchet tooth 13. A line passing through the edge 35 and the center of the pivot 36 of the pawl constitutes the load line thereof, and any tension exerted by the braking mechanism through the clevis 23 to the brake lever must necessarily exert a pull along this load line. The angular relation of the pawl edge 35 and the surface of a tooth 13 which it engages is such that wear resulting from constant clutching and unclutching of the pawl while under load proceeds along the angular portion 40 of the web. It follows, then, that full engagement between the aligned pawl and sector is maintained irrespective of wear on the edge 35.

By maintaining constant alignment between the pawl and sector these parts may be made from thinner sections, thereby allowing the use of thinner sections in the other parts constituting the brake lever assembly. It will be observed that the lever of the present invention consists entirely of stamped parts, it being unnecessary to maintain the close manufacturing tolerances required in the present or conventional types of brake levers. By virtue of this elimination of manufacturing tolerances, the lever of the present invention may be manufactured in quantity lots at low manufacturing costs.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A brake lever construction comprising a support, a lever straddling and being pivoted to said support, a ratchet sector having teeth, a U-shaped pawl having side walls connected by a web portion, said pawl side walls being pivotally connected to said lever and in constant engagement with the side surfaces of said sector for holding the pawl and sector in alignment, an edge of the web portion of said pawl normally engaging the face of one of said sector teeth for holding said lever in adjusted position, and means movable independently of movement of said lever for rocking the edge of said pawl web out of engagement with said sector.

2. A brake lever construction comprising a mounting bracket having a portion formed as a sector with concentric edges, the outer of said edges being formed as a ratchet, the other or inner of said edges having end stop portions, a stamped metal lever of U-shaped cross-section having a grip portion at one end and spaced legs at the other end, the spaced legs of said lever straddling said bracket and pivoted thereto at the center of curvature of said concentric edges, means connecting said lever to the brake actuating mechanism and coacting with the end stop portions of said other sector edge to limit the swinging amplitude of said lever, a U-shaped pawl having side walls and a connecting web arranged to straddle said sector with its side walls in face engagement with the side surfaces of the sector, an edge at one end of the connecting web of said pawl normally engaging said sector to hold the lever in adjusted position, ear portions struck out from the side walls of said pawl and constituting U-shaped link means, a U-shaped pawl release member having a grip portion at one end and its other end operatively connected to said U-shaped link means for rocking the pawl out of engagement with said sector, said release member arranged in pivotal nested relation within said lever with their webs in opposition and their grip portions defining an enclosed handle, and means for normally holding the grip portion of said release member in a projected operative position.

3. A stamped metal pawl and ratchet construction for a brake lever including a U-shaped pawl having side walls straddling said ratchet and a connecting web having an edge arranged to engage a face of a tooth of said ratchet, and ears struck out from said side walls and extending from the other side of said web to form connecting means for rocking said pawl into and out of engagement with said ratchet.

4. A one-piece sheet metal pawl including a web and spaced side walls extending in one direction therefrom, and an ear struck out from each of said side walls and extending from the web in the opposite direction.

5. A brake lever construction comprising a lever arranged for pivotal connection to a support, a ratchet sector, a U-shaped pawl having sidewalls and a connecting web extending transversely of the center line of said lever on both sides thereof and being pivotally connected to said lever in straddling relation with respect to said support, and an edge of said connecting web being arranged for engaging said sector for holding the lever in an adjusted position.

6. A brake lever construction comprising a fixed support, a lever member having spaced sidewalls straddling and being pivotally connected to said support, a ratchet formed on an edge of said support, a U-shaped pawl having spaced sidewalls and a connecting web, a pivot adjacent said web for connecting the sidewalls of said pawl to and between the sidewalls of said lever member, said pawl straddling said support with the web thereof lying closer to said ratchet than the free ends of its sidewalls for constantly maintaining said pawl sidewalls in said straddling relation as the pawl is rocked on said pivot, an edge of said pawl web being rockable into and out of engagement with said ratchet for holding said lever member in and for releasing the lever member from an adjusted position, and means for so rocking said pawl.

7. A brake lever construction comprising a support having a ratchet sector on an edge thereof, a lever of U-shaped cross-section having spaced legs straddling and being pivotally connected to said support, a U-shaped pawl having sidewalls and a connecting web, the sidewalls of said pawl being pivotally connected to the sidewalls of said lever and straddling said support, ears struck out from the sidewalls of said pawl, and means connected to said ears for rocking an edge of the web of said pawl into and out of engagement with said ratchet sector for holding said lever in and releasing said lever from an adjusted position.

8. A brake lever construction comprising a support having a ratchet sector on an edge thereof, a lever of U-shaped cross-section having spaced legs at one end thereof straddling and being pivotally connected to said support, a U-shaped pawl having sidewalls and a connecting web, a pivot connecting the sidewalls of said pawl to and between the sidewalls of said lever and straddling said support, ears struck out from the sidewalls of said pawl and extending away from the web thereof in a direction opposite to its sidewalls, and a release member pivotally connected to said lever and to said ears for rocking an edge of the web of said pawl into and out of engagement with said ratchet sector for holding said lever in and releasing said lever from an adjusted position.

9. A brake lever construction comprising a support having a ratchet sector on an edge thereof, a lever of U-shaped cross-section having a grip portion at one end and spaced legs at its other end straddling said support and being pivotally connected thereto, a U-shaped pawl having sidewalls and a connecting web, a pivot connecting the sidewalls of said pawl to the sidewalls of said lever and straddling said support, ears struck out from the sidewalls of said pawl and extending away from the web in a direction opposite to the pawl sidewalls, a U-shaped release member having a grip portion at one end thereof and its other end operatively connected to said ears, said release member being pivotally connected to and between the sidewalls of said lever for rocking said pawl into and out of engagement with said sector, a partially circular compartment formed in the sidewalls of said release member, and a coil spring in said compartment between the webs of said lever and release member for normally maintaining the release member in a position in which said pawl engages said ratchet sector.

RAY A. SANDBERG.